United States Patent
Csabi et al.

(10) Patent No.: US 11,830,067 B1
(45) Date of Patent: *Nov. 28, 2023

(54) AUTOMATICALLY GENERATING AND UPDATING LOAN PROFILES

(71) Applicant: United Services Automobile Association (USAA), San Antonio, TX (US)

(72) Inventors: Rachel Elizabeth Csabi, Frisco, TX (US); Yan Pei, Frisco, TX (US); Yogen Rai, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,798

(22) Filed: Sep. 15, 2022

Related U.S. Application Data

(63) Continuation of application No. 17/103,560, filed on Nov. 24, 2020, now Pat. No. 11,488,242.

(Continued)

(51) Int. Cl.
    *G06Q 40/00*     (2023.01)
    *G06Q 40/03*     (2023.01)
(Continued)

(52) U.S. Cl.
    CPC ........... *G06Q 40/03* (2023.01); *G06F 16/903* (2019.01); *G06N 7/01* (2023.01); *G06Q 10/10* (2013.01);
(Continued)

(58) Field of Classification Search
    CPC ...... G06Q 40/025; G06Q 10/10; G06Q 40/06; G06Q 40/08; G06Q 40/123; G06Q 50/16; G06Q 50/18; G06F 16/903; G06N 7/005
(Continued)

(56) References Cited

U.S. PATENT DOCUMENTS

| | | | | | |
|---|---|---|---|---|---|
| 4,774,664 | A | * | 9/1988 | Campbell | .............. G06Q 40/03 |
| | | | | | 705/38 |
| 5,611,052 | A | * | 3/1997 | Dykstra | ................. G06Q 40/00 |
| | | | | | 705/38 |

(Continued)

OTHER PUBLICATIONS

Social Media Analytics for Better Detection of Fraudulent Applications for Online Microfinance Loans; 2019 International Conference on Engineering and Telecommunication (EnT) (pp. 1-4); Valentina Kuznetsova, Iskandar Azhmuhamedov; Nov. 20, 2019. (Year: 2019).*

(Continued)

*Primary Examiner* — Tien C Nguyen

(74) *Attorney, Agent, or Firm* — Fletcher Yoder, P.C.

(57) ABSTRACT

A system may include a processor that may detect one or more loan indicators present in banking data or credit data associated with a user. The processor may then retrieve additional data associated with the user in response to detecting the one or more loan indicators, such that the additional data may include data acquired from a home assistant device, a wearable device, a computing device, or any combination thereof. The processor may then determine a loan probability associated with the user based on the banking data, the credit data, and the additional data. The processor may then determine a pre-approval loan amount based on the banking data and the credit data in response to the loan probability exceeding a threshold and automatically send a notification indicative of a pre-approval loan amount to a computing device associated with the user.

20 Claims, 3 Drawing Sheets

Related U.S. Application Data

Figure 1:
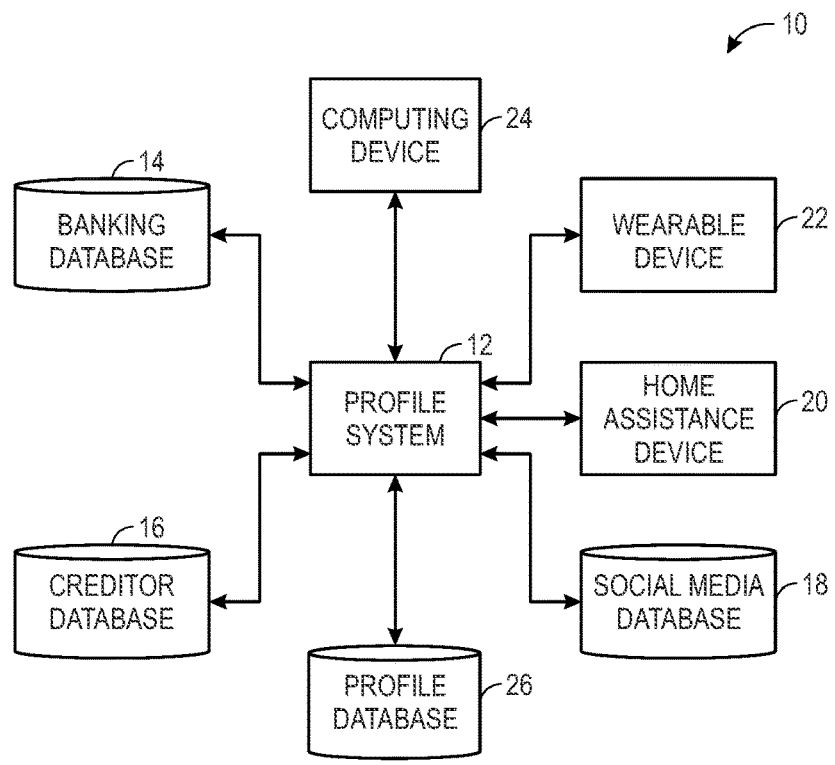

(60) Provisional application No. 62/941,058, filed on Nov. 27, 2019.

(51) Int. Cl.

| | | |
|---|---|---|
| *G06F 16/903* | (2019.01) | |
| *G06Q 40/06* | (2012.01) | |
| *G06Q 50/16* | (2012.01) | |
| *G06Q 40/08* | (2012.01) | |
| *G06Q 40/12* | (2023.01) | |
| *G06Q 10/10* | (2023.01) | |
| *G06Q 50/18* | (2012.01) | |
| *G06N 7/01* | (2023.01) | |

(52) U.S. Cl.
CPC ............ *G06Q 40/06* (2013.01); *G06Q 40/08* (2013.01); *G06Q 40/123* (2013.12); *G06Q 50/16* (2013.01); *G06Q 50/18* (2013.01)

(58) Field of Classification Search
USPC .......... 705/39, 37, 38, 40, 26; 235/378, 379; 726/25, 2; 709/226, 246; 715/700; 707/793; 706/25, 45
See application file for complete search history.

(56) References Cited

U.S. PATENT DOCUMENTS

| | | | | |
|---|---|---|---|---|
| 7,493,279 B1* | 2/2009 | Kwan | ................. | G06Q 40/04 705/37 |
| 7,653,592 B1* | 1/2010 | Flaxman | ................. | G06Q 40/03 705/37 |
| 7,716,125 B2* | 5/2010 | Shavit | ................. | G06Q 40/02 705/38 |
| 7,761,356 B2* | 7/2010 | Daniels | ................. | G06Q 40/06 705/36 R |
| 7,822,681 B2* | 10/2010 | Farias | ................. | G06Q 20/102 705/38 |
| 7,925,579 B1* | 4/2011 | Flaxman | ................. | G06Q 40/00 705/37 |
| 8,244,618 B1* | 8/2012 | Fashenpour | ........... | G06Q 40/00 705/36 R |
| 8,639,614 B2* | 1/2014 | Greenland,II | ......... | G06Q 40/04 235/379 |
| 8,660,942 B2* | 2/2014 | Cohen | ................. | G06Q 40/03 705/38 |
| 8,751,351 B1* | 6/2014 | Smith | ................. | G06Q 40/02 705/26.35 |
| 9,875,491 B2* | 1/2018 | Weksler | ................. | G06Q 40/03 |
| 10,387,950 B2* | 8/2019 | Dziuk | ................. | G06Q 40/03 |
| 2003/0018558 A1* | 1/2003 | Heffner | ................. | G06Q 40/02 705/37 |
| 2010/0312691 A1* | 12/2010 | Johnson, Jr. | .......... | G06Q 40/03 705/38 |
| 2014/0040111 A1* | 2/2014 | Bettios | ................. | G06Q 40/02 705/38 |
| 2014/0365350 A1* | 12/2014 | Shvarts | ................. | G06Q 40/00 705/35 |

OTHER PUBLICATIONS

Revealing Key Non-financial Factors for Online Credit-Scoring in e-Financing; 2013 10th International Conference on Service Systems and Service Management (pp. 547-552); Ying Wang, Siming Li, Zhangxi Lin; Jul. 17, 2013.. (Year: 2013).*

Lee, Vincent et al., "An Intelligent System for Business Loan Processing", 2012 Third International Conference on Intelligent Systems Modelling and Simulation, pp. 1-7.

* cited by examiner

AUTOMATICALLY GENERATING AND UPDATING LOAN PROFILES

CROSS-REFERENCE TO RELATED APPLICATION

This application is a continuation of U.S. patent application Ser. No. 17/103,560, entitled "AUTOMATICALLY GENERATING AND UPDATING LOAN PROFILES," filed Nov. 24, 2020, which claims priority to and the benefit of, U.S. Provisional Patent Application Ser. No. 62/941,058, titled "AUTOMATICALLY GENERATING AND UPDATING LOAN PROFILES," which was filed on Nov. 27, 2019, both of which are incorporated herein by reference in their entireties.

BACKGROUND

The present disclosure relates generally to automatically tracking and updating banking transaction data. More specifically, the present disclosure relates to automatically tracking banking transactional data, such that a digital profile representative of the transactional data is available upon request.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a processor that may detect one or more loan indicators present in banking data or credit data associated with a user. The processor may then retrieve additional data associated with the user in response to detecting the one or more loan indicators, such that the additional data may include data acquired from a home assistant device, a wearable device, a computing device, or any combination thereof. The processor may then determine a loan probability associated with the user based on the banking data, the credit data, and the additional data. The processor may then determine a pre-approval loan amount based on the banking data and the credit data in response to the loan probability exceeding a threshold and automatically send a notification indicative of a pre-approval loan amount to a computing device associated with the user.

In another embodiment, a method may include detecting, via a processor, one or more loan indicators present in banking data or credit data associated with a user. The method may also involve retrieving additional data associated with the user in response to detecting the one or more loan indicators, such that the additional data may include data acquired from a home assistant device, a wearable device, a computing device, or any combination thereof. The method may then involve determining a loan probability associated with the user based on the banking data, the credit data, and the additional data, determining a pre-approval loan amount based on the banking data and the credit data in response to the loan probability exceeding a threshold, and automatically sending a notification indicative of a pre-approval loan amount to a computing device associated with the user.

In yet another embodiment, a non-transitory computer-readable medium may include computer-executable instructions that, when executed, cause at least one processor to perform operations including detecting one or more loan indicators present in banking data or credit data associated with a user. The operations may also include retrieving additional data associated with the user in response to detecting the one or more loan indicators, such that the additional data may include data acquired from a home assistant device, a wearable device, a computing device, or any combination thereof. The operations may also include determining a loan probability associated with the user based on the banking data, the credit data, and the additional data. The operations may then involve determining a pre-approval loan amount based on the banking data and the credit data in response to the loan probability exceeding a threshold and automatically sending a notification indicative of a pre-approval loan amount to a computing device associated with the user.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

Figure 2:
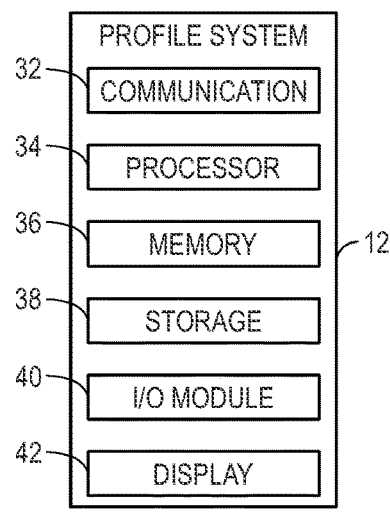
Figure 3:
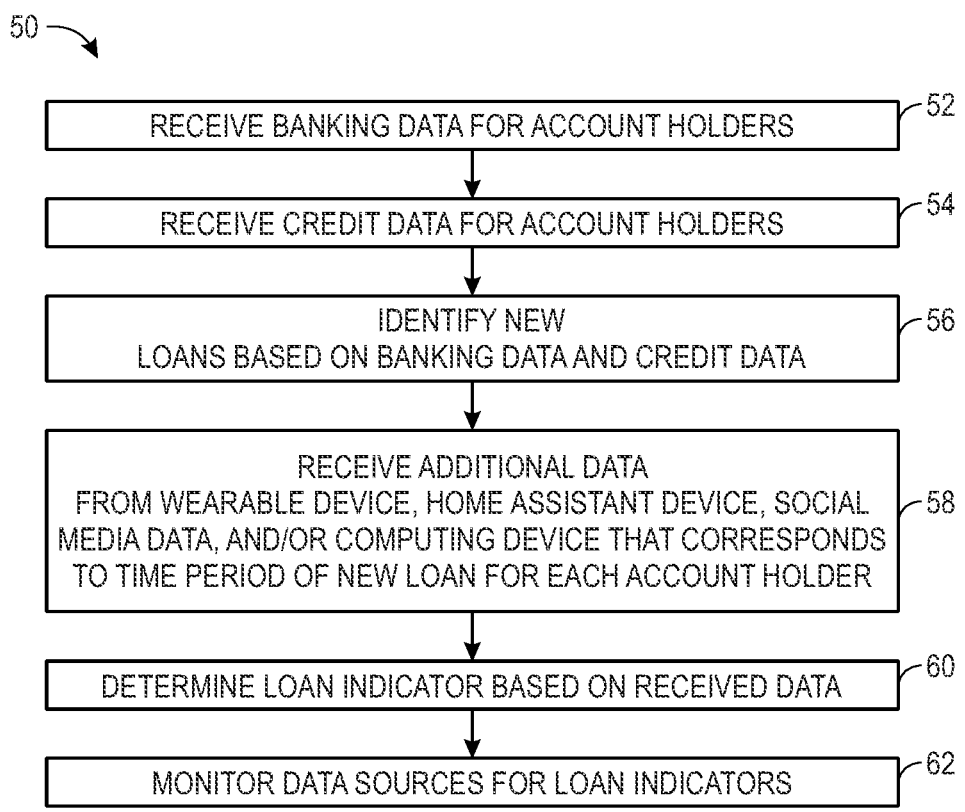
Figure 4:
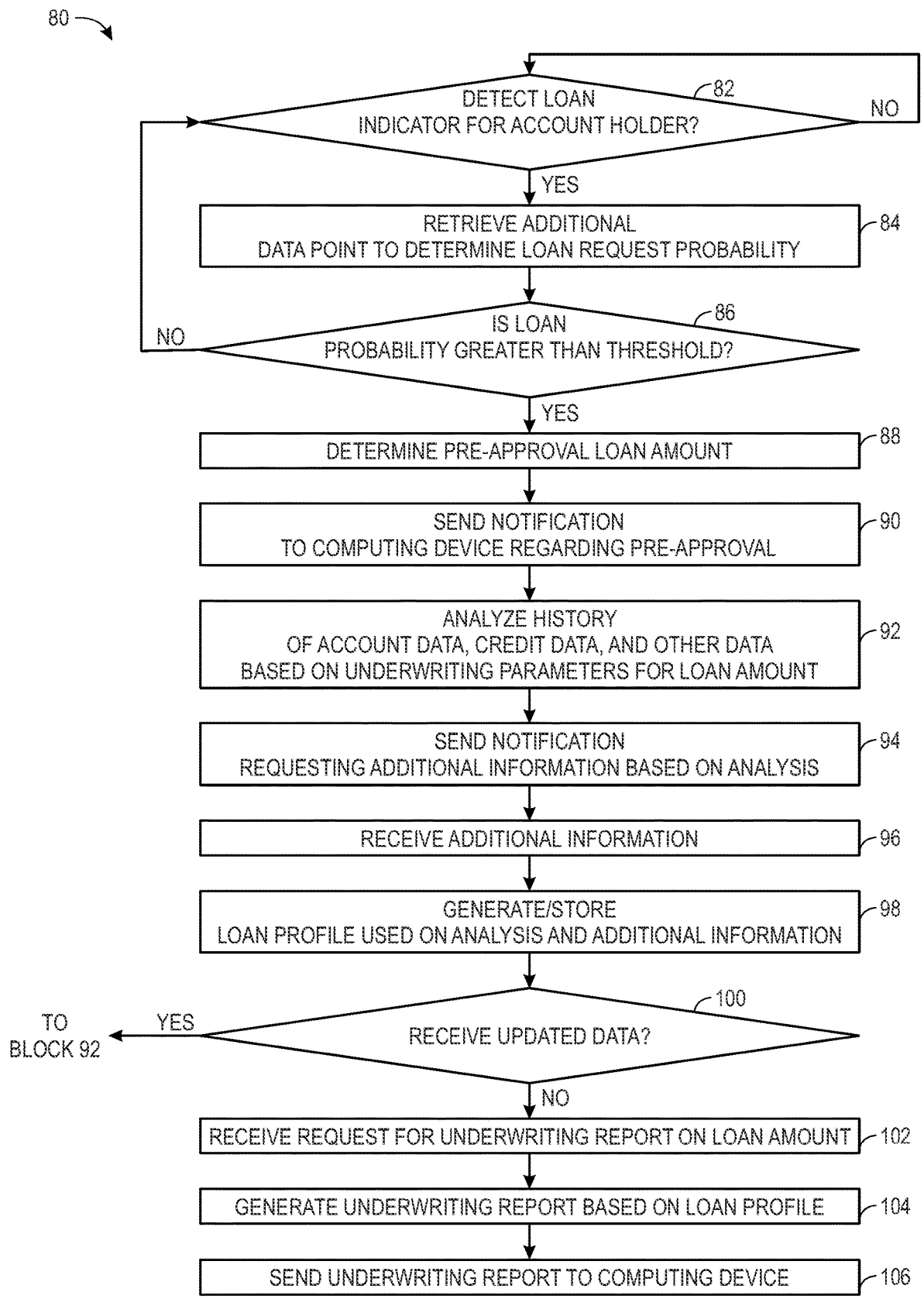

These and other features, aspects, and advantages of the present disclosure will become better understood when the following detailed description is read with reference to the accompanying drawings in which like characters represent like parts throughout the drawings, wherein:

FIG. 1 a block diagram of an underwriting monitor system, in accordance with embodiments described herein;

FIG. 2 a block diagram of a profile system that may be part of the underwriting monitor system of FIG. 1, in accordance with embodiments described herein;

FIG. 3 illustrates a flow chart of a method for determining loan indicators for a user of the profile system who may be considering applying for a loan, in accordance with embodiments described herein; and FIG. 4 illustrates a flow chart of a method for generating an updating an underwriting report, in accordance with embodiments described herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When obtaining a loan or mortgage, a user or organization may complete an application with a loan provider, who may then assess the risk of the applicant to determine an amount of funds that the applicant may receive from the loan provider. The approval process for securing the loan for a particular loan amount can be time consuming and usually involves information being provided by the applicant for analysis by an underwriter assessing the risk. In a competitive market for finance (e.g., loan) secured properties, a buyer may have an advantage by providing an offer that indicates that a loan commitment is secured or closing the transaction may occur in a shorter amount of time as compared to other competing offers. Indeed, some prospective buyers are overlooked by sellers due to the delay involved in securing funding. These prospective buyers may become disenchanted with the loan approval process, the inability to compete with offers that do not require financing, and the like.

With this in mind, improved systems and methods may be used to allow individuals to be ready for securing financing for certain transaction immediately or within seconds of requesting the financing. In some embodiments, a profile system may monitor certain databases to predict a time period in which a user may request to secure financing for a purchase. For example, the profile system may review banking data, creditor data, and other data to identify certain patterns or expected behavior for users having similar data attributes (e.g., direct deposits, balance, credit score, age). The patterns or expected behavior may be associated with certain actions or data that precede a request for securing a loan, an indication of a recurring loan payment, or the like. In response to detecting that a likelihood of a user requesting to secure a loan exceeds some threshold, the profile system may automatically begin collecting data, requesting information, and performing other actions associated with securing a loan or having an application provided to an underwriter for approval.

In other words, the profile system may continuously (e.g., at regular intervals) monitor the data attributes of a user and begin collecting data for securing a loan even when the user has not sent a request or shown an interest in securing the loan. More specifically, the profile system may generate and store a loan or mortgage profile that includes the data relevant for securing a loan for an object that the profile system may predict that the user may purchase in the future. The profile system may continually update the loan profile even after the loan profile is created, such that updated information relevant to securing a loan is readily assembled, such that it may be provided to an underwriter upon request.

In some embodiments, the profile system may generate metrics or measurable data related to the loan being obtained. For example, the profile system may identify possible house price ranges, possible mortgage rates and terms, and other data for the user seeking the loan. In addition, the profile system may utilize machine learning to analyze and identify these various metrics for users.

By way of introduction, FIG. 1 illustrates a block diagram of an underwriting system 10 that illustrates an example of data provided to a profile system 12, such that the profile system 12 may monitor data related to a potential buyer, predict instances when the potential buyer may seek to secure a loan to purchase an item, automatically generate a loan profile for the potential buyer, and automatically update the loan profile based on updated information. Although the profile system 12 illustrates that it may be connected to a certain number of data sources, it should be noted that, in other embodiments, the profile system 12 may include a number of additional sources or fewer sources than illustrated.

Referring to FIG. 1, in one embodiment, the underwriting system 10 may include the profile system 12, which may receive data regarding the prospective buyer. Using this data, the profile system 12 may determine loan or mortgage indicators that may be indicative of the prospective buyer seeking to secure a loan. In addition, the profile system 12 may automatically generate a loan profile, which may digitally represent information related to an underwriter evaluating the risk and ability of the prospective buyer to secure a loan. By way of example, the loan profile may include data related to income for the buyer from an employer, additional income for the buyer from investments, assets (e.g., property, stocks, bonds) owned by the buyer, credit history of the buyer, credit score of the buyer, and the like. In addition to the data representative of values for the respective elements, the loan profile may include documents that verify the respective elements. Additional details with regard to the loan profile will be discussed below.

In one embodiment, the profile system 12 may be any suitable computing device capable of receiving data, performing analysis on the data, and outputting data to a user, a display, a communication network or the like. Additional details regarding the profile system 12 will be described with reference to FIG. 2.

As mentioned above, the profile system 12 may receive data regarding the prospective buyer. By way of example, the profile system 12 may access a banking database 14 that may include data related to the prospective buyer and other users. The banking database 14 may include data related to income received by a user as deposits, direct deposits, regular-interval deposits, and the like. In some embodiments, each deposit may be associated with a source of the funds, an amount of the funds, and a description related to the funds. The banking database 14 may also include information related to withdrawals or payments made on the behalf of the prospective buyer. In the same manner as the deposits, the withdrawal data may be characterized with a destination party for the funds, an amount of the withdrawal funds, a description related to the withdrawal funds, and the like.

In some embodiments, the banking database 14 may include data related investment instruments, such as mutual funds, real estate, stocks, life insurance policies, and other investment vehicles, that may be owned by the prospective buyer. As such, the banking database 14 may include data related to transactions that occur using investment instruments and other non-cash types of investments.

In addition to the banking database 14, the underwriting system 10 may include a creditor database 16. The creditor database 16 may include data related to a credit score or credit profile for various users. In some embodiments, the creditor database 16 may include documents indicative of credit information related to the users. For example, the creditor database 16 may include pre-approval loan letters, existing loan documents, and the like. In addition, the creditor database 16 may include a list of liabilities for various users, a debt-to-asset ratio for the various users, and other suitable information that may be relevant to the users' credit profiles.

In some embodiments, the underwriting system 10 may also include a social media database 18. The social media database 18 may store data scraped or acquired via social media websites or applications. The social media data may include information that characterize some of the interests of various users. By way of example, the social media database 18 may include data acquired from various social media sites such as Facebook®, Twitter®, Instagram®, and the like. In certain embodiments, the data in the social media database 18 may provide additional information regarding the social attributes of the users, such as whether certain life events (e.g., marriage, children, retirement) may have occurred, interests associated with the users, and the like.

Additionally, the underwriting system 10 may also include other databases or sources of data that provide additional information regarding users who may seek financial instruments, such as loans. These additional data sources may include a number of databases or network-connected computers that include information regarding current events, financial market data, political events, environmental conditions, and the like. That is, since financial markets may be affected due to different political parties holding various political positions throughout the world, conflicts arising between different nations or within a particular nation, natural disasters occurring in certain areas, and the like, the additional databases may provide information related to these items through access to various websites and databases that may include general information that may be related to the financial sector.

In addition to the databases discussed above, the profile system 12 may receive data or output data to various devices that may be part of the underwriting system 10. For example, the underwriting system 10 may include a home assistant device 20, a wearable device 22, a computing device 24, and the like. The home assistant device 20 may be a smart speaker that may include a microphone or sensors that receive audio data as spoke by users. The audio data may be interpreted by the home assistant device 20 to determine certain characteristics that describe the users who provided the audio data. The home assistant device 20 may thus determine, based on the audio data, an age of the user, a number of occupants living in a structure or house, demographic information regarding the user, and the like. In addition, the home assistant device 20 may receive a request to initiate a loan process for purchasing a property in accordance with the embodiments described herein.

The wearable device 22 may include any suitable wearable smart device that may track movement of a user, send data to other network-connected devices, and the like. In some embodiments, the location of the wearable device 22 may be provided to the profile system 12 to enable the profile system 12 to determine areas or locations that the user wearing the wearable device 22 may frequently visit. In some embodiments, the data provided by the wearable device 22 may provide the profile system 12 with insight into a lifestyle associated with the user. That is, if the wearable device 22 provides data indicative of the user running or exercising regularly, the profile system 12 may determine that the user may have an active lifestyle and may desire to live in an area that has a number of walking or jogging trails.

The computing device 24 may include any suitable computing device, such as a general-purpose computer, a smart phone, a tablet device, and the like. The computing device 24 may perform similar operations as described as being performed by the home assistant device 20 or the wearable device 22.

With the foregoing in mind, the profile system 12 may include any suitable computing device such as a general-purpose computer, a mobile-computing device, a tablet-computing device, a laptop-computing device, or the like. In certain embodiments, the profile system 12 may receive data from the various sources illustrated in FIG. 1 and generate a loan profile for a user based on the received data. More specifically, the profile system 12 collect financial data related to a user's risk in obtaining a loan, generate a loan profile based on the collected information, and continually update the loan profile as additional data becomes available. In this way, the profile system 12 may provide the loan profile to a loan or underwriting organization to expedite the loan approval process. In addition, the profile system 12 may track data related to actions performed by the user, determine whether the actions correspond to indicators or precursors to the user seeking a loan, and automatically update the loan profile based on the actions being indicators of the user seeking the loan. By continuously collecting data and updating the loan profile for the user, the profile system 12 may better equip users to provide competitive offers for purchasing a property because the data involved in underwriting is readily available, thereby expediting the loan process. In one specific example, the profile system 12 helps enable users to provide a competitive offer as compared to other users that provide full cash offers by reducing the time involved with obtaining loan approval.

In addition, by collecting the information and updating the loan profile over a period of time, the present embodiments reduce network traffic and increase computing efficiency by keeping the load profile up to date. That is, without employing the automatic collection process described herein, a computing device retrieving all of the information from various information sources during the same time period may cause the computing device to operate less efficiently.

To perform some of the actions set forth above, the profile system 12 may include certain components to facilitate these actions. FIG. 2 is a block diagram of example components within the profile system 12. It should be noted that the home assistant device 20, the wearable device 22, and the computing device 24 may include similar components for performing its respective operations. Referring now to FIG. 2, the profile system 12 may include a communication component 32, a processor 34, a memory 36, a storage 38, input/output (I/O) ports 40, a display 42, and the like. The communication component 32 may be a wireless or wired communication component that may facilitate communication between the profile system 12, the various databases described above, the home assistant device 20, the wearable device 22, the computing device 24, and any other communication-enable device.

The processor 34 may be any type of computer processor or microprocessor capable of executing computer-executable code. The processor 34 may also include multiple processors that may perform the operations described below. The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 36 and the storage 38 may also be used to store the loan profile and the like. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components such as input devices (e.g., keyboard, mouse), sensors, input/output (I/O) modules, and the like. The display 42 may operate to depict visualizations associated with software or executable code being processed by the processor 34. In one embodiment, the display 42 may be a touch display capable of receiving inputs from a user of the profile system 12. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the profile system 12.

It should be noted that the components described above with regard to the profile system 12 are exemplary components and the profile system 12 may include additional or fewer components as shown. As such, the profile system 12 should not be limited to including just the components described herein.

With the foregoing in mind, FIG. 3 illustrates a flow chart of a method 50 employed by profile system 12 for determining loan indicators in accordance with embodiments herein. Although the following description of the method 50 is described in a particular order, it should be noted that the method 50 is not limited to the depicted order; and, instead, the method 50 may be performed in any suitable order. In addition, although the profile system 12 is described as performing the method 50, it should be noted that any suitable computing device may perform the method 50.

Referring now to FIG. 3, at block 52, the profile system 12 may receive banking data for account holders. In some embodiments, the banking data may include asset data, such as an account balance, an income data, a payment schedule, a debt schedule, and the like. The income data and payment schedule may detail when deposits or payments are expected to be received in an account. The banking data may provide information related to the users that own accounts associated with an organization that manages the banking database 14. As such, the banking data may include data related to a status of a bank account associated with various account holders. The banking data may provide insight into a user's risk level for obtaining a loan based on the account balances over time, the amount of income that the account holder receives, the amount of debt paid over a period of time, and the like. Although the banking data may be received via the banking database 14, it should be noted that the banking data may be received via any other suitable storage component.

At block 54, the profile system 12 may receive credit data for the account holders in which banking data was received. In some embodiments, the credit data may also include information related to users that are not affiliated with the banking database 14. In any case, the credit data may include information relevant to an amount of credit that a respective user may be afforded. That is, the credit data may provide a credit score, a list of liabilities, a list of debts owed, a debt-to-asset ratio, and other factors that may relate to the credit history of a user.

The profile system 12 may receive the credit data from other data sources other than the banking database 14. Indeed, the profile system 12 may collect data from different data sources that may be formatted as different data types, presented as different values (e.g., score, percentage), and the like. However, by collecting data from various sources, the profile system 12 may collect, convert, and consolidate information received from various sources and in various formats into one format via the loan profile.

The banking data and the credit data received at blocks 52 and 54 may provide some insight into circumstances or conditions that may be present when a user may seek to purchase a property via obtaining a loan. As such, at block 56, the profile system 12 may review the banking data and the credit data to identify instances or times in which a user, a group of users, an organization, or a group of organizations obtained a new loan. The profile system 12 may identify the instances when a new loan is obtained based on a regular payment made to a banking or financial institution, as determined via banking data, when a credit profile is changed to indicate a threshold change in debt-to-asset ratio, as determined via credit data, or the like. In some embodiments, the user may provide an indication to the profile system 12 indicating that the user has been approved for a loan.

At block 58, the profile system 12 may receive additional data that corresponds to a certain time period prior to the user(s) receiving the loan. In some embodiments, the additional data may be received from the home assistant device 20, the wearable device 22, the computing device 24, or the like. The additional data may provide insight or information with regard to behavior patterns for the user(s) prior to receiving the loan. For example, the additional data may indicate that the user visited a threshold amount of homes listed as being for sale within a certain time period prior to receiving the loan. The pattern of visiting homes that are listed for sale may be identified as a potential indicator that the user is seeking to purchase a home using financing. In the same manner, the additional data may be indicative of a user visiting car dealership, and the profile system 12 may glean that the user is interested in purchasing a vehicle using a loan.

In addition to location data, the home assistant device 20 may receive inquiries for obtaining financing to purchase a property, requests for information related to securing financing, requests for information on certain types of products (e.g., property), requests for information on manufacturers, requests for ratings on financial institutions, requests for ratings on loan officers, and the like. In some embodiments, the home assistant device 20 may monitor requests to determine household data, such as a number of occupants in the household, the age of the occupants, the location of the household, and the like. The profile system 12 may use the household data to determine whether a user residing in the house may seek financing for a future loan to purchase a new house. That is, the profile system 12 may determine whether the household data is comparable to other users living in a house with the similar number of occupants and having the same amount of space. In addition, the profile system 12 may leverage the banking data and the credit data received at blocks 52 and 54 to determine whether the users may be positioned to obtain a loan for the purchase of a new house based on the household data, banking data, and credit data for other users with similar types of occupants.

The wearable device 22 and the computing device 24 may provide similar data as described as being received via the home assistant device 20. In addition, the wearable device 22 may provide additional information with regard to an activity level of the user. In this way, activity data of a user may be used by the profile system 12 to provide additional insight into the character of the user.

In some embodiments, the profile system 12 may receive social media data from the social media database 18 for analysis. That is, the profile system 12 may determine whether the users who received a new loan performed certain activities via social media prior to obtaining the loan. The social media data may include status updates, postings, pictures, and other similar types of information provide via a social media website or the like.

At block 60, the profile system 12 may analyze the data received at blocks 52, 54, 56, and 58 to identify patterns of behavior, similar banking data, similar credit data, and other identifiable features related to the users that obtain a loan. That is, the profile system 12 may analyze a time period (e.g., days, weeks, months) to identify certain shared data characteristics (e.g., account balance, travel) of users or organizations that obtained a loan after the time period expired. The properties identified by the profile system 12 during the time period may be designated as loan indicators. Loan indicators may correspond to patterns of activities (e.g., movement, requests) or similar data profiles (e.g., similar banking data, account balances, credit score) that are shared by those users that obtain a loan to purchase a property.

By way of example, the loan indicators may include an account balance of a threshold amount, a credit score above a certain level, household data indicating that more than a threshold number of users live in the same home, and pattern data of users visiting homes listed for sale for during a period of time. In some embodiments, after the loan indicators are determined, the profile system 12 may, at block 62, monitor one or more data sources (e.g., banking database 14, social media database 18, wearable device 22) for the presence of at least one of the loan indicators. The presence of one or more loan indicators for a user that may not have requested a loan may cause the profile system 12 to automatically initiate the loan approval process for the user. In this way, the profile system 12 may automatically begin collecting information from the user who may potentially seek a loan before the user may be considering obtaining a loan. By collecting the relevant information prior to the user requesting the information, the profile system 12 may generate an underwriting report and store the relevant information as a loan profile for the user, such that the loan profile is available for the user upon request (e.g., within seconds).

Keeping this in mind, FIG. 4 illustrates a flow chart of a method 80 for monitoring data sources for loan indicators, automatically generating a loan profile for a user in response to the presence of the loan indicators and providing a computing system a notification indicative of the loan profile upon request. Although the following description of the method 80 is described as being performed by the profile system 12, it should be understood that any suitable computing system may perform the method 80 described herein. In addition, it should be noted that the method 80 may be performed in any suitable order.

Referring now to FIG. 4, at block 82, the profile system 12 may determine whether a loan indicator is present for a user or account holder. That is, the profile system 12 may monitor the data sources described above to determine whether a loan indicator is present. By way of example, the profile system 12 may detect whether multiple loan indicators from different data sources (e.g., banking database, creditor database, social media database, devices) are present for a particular user. In some embodiments, the profile system 12 may monitor the various data sources regularly at some pre-defined time interval. Alternatively, the profile system 12 may monitor the various data sources at irregular intervals based on the presence of a certain condition or event (e.g., trigger event, birthday, key words detected, activity change).

If the loan indicators are not detected, the profile system 12 may continue receiving data from the various data sources and return to block 82. If, however, the profile system 12 detects one or more loan indicators being present in the data sources, the profile system 12 may proceed to block 84. At block 84, the profile system 12 may retrieve additional data points to determine a loan request probability. That is, the presence of one or more loan indicators may not correspond to the user requesting a loan or considering purchasing a property using a loan. However, as more loan indicators are detected, the likelihood or probability of the user being evaluated is seeking a loan or will seek a loan in the future increases. As such, at block 84, after the profile system 12 receives at least one loan indicator, the profile system 12 may query other data sources to retrieve additional data points that may be related to the user's likelihood or probability of seeking a loan. In some embodiments, the profile system 12 may retrieve data from the data sources based on a time period that includes the detected loan indicator. As such, the profile system 12 may determine whether a pattern of data is present for the user that is indicative of the user being interested or likely to seek approval for a loan. In some embodiments, the profile system 12 may use machine learning algorithms or artificial intelligence programs to compare the pattern of data for the user with other users who sought loans to determine whether the user shares data properties with other users who sought loans within a threshold amount of time after the loan indicator(s) were detected at block 82.

For example, the profile system 12 may identify patterns of behavior from the additional data and correlate or associate the corresponding banking data and/or credit data to the detected patterns. The profile system 12 may then compare the correlated pattern data to pattern data for other individuals who may have sought approval for a loan in the past. The amount of similarities between the correlated pattern data and the pattern data for other individuals may be used to determine the loan probability. In this way, an individual's behavior, banking data, and credit data may be analyzed together in real time to assess the individual's likelihood of seeking a loan in the near future (e.g., weeks, months).

At block 86, the profile system 12 may determine whether a probability (e.g., loan probability) of the user seeking a loan is greater than a threshold. The loan probability may be determined based on a percentage of data points shared between the user and the users that obtained a loan within a threshold amount of time after at least one of the shared datapoints is dated. It should be noted that the loan probability may be determined in any suitable number of ways based on the data points for the users that received a loan, as compared to the loan indicators present for the user being evaluated by the profile system 12.

If the loan probability does not exceed a threshold, the profile system 12 may return to block 82 and continue monitoring for loan indicators. However, if the profile system 12 determines that the loan probability is indeed greater than or equal to the threshold, the profile system 12 may proceed to block 88 and determine a pre-approval loan amount. The pre-approval loan amount may be determined based on the banking data and the credit data available to the profile system 12. That is, the profile system 12 may perform an initial analysis to determine whether the user may qualify for a loan of a certain amount based on the data available to the profile system 12. Although the pre-approval loan amount may provide an indication to the user of an amount in which the user may borrow, the pre-approval loan amount may not be guaranteed until an underwriting process is undertaken to verify that the data obtained by the profile system 12 is accurate and is considered acceptable by a respective underwriting authority.

After determining the pre-approval loan amount, the profile system 12 may, at block 90, automatically send a notification to a computing device associated with the user who qualified for the pre-approval loan amount. The notification may cause the computing device to dynamically display a visualization that may notify the user of the pre-approval loan amount. In some embodiments, the notification may cause the computing device to automatically open an application or execute software stored on the computing device to generate and present the visualization, such that the application may execute even if it is not actively operating or is operating in a sleep or inactive state. In this way, the user may become aware of the pre-approval loan amount since the user did not apply or seek to obtain a loan. Indeed, the profile system 12 automatically determined that the user may soon be interested in purchasing property that may involve obtaining a loan. In some instances, the notification may prompt the user to consider buying property because he/she is in a financial condition to obtain the loan.

After sending the notification at block 90, the profile system 12 may begin collecting data and performing analysis related to the underwriting procedure. As such, the profile system 12 may collect data (e.g., documents, verification) that may be provided to an underwriter, such that the underwriter can properly asses the risk for a loan provider providing the loan to the user. By way of example, the data related to the underwriting process may include a record (e.g., tax form, W2 form) of wage and salaries paid from current and past employers, previous paycheck stubs, previous bank statements, previous tax returns, letters for gifts received from others, lists of debts, lists of assets, proof of timely rental payment, credit reports, profit and loss statements, sales agreement, proof of additional income, divorce decree (if applicable), bankruptcy documents (if applicable), and the like. In some embodiments, the profile system 12 may retrieve certain documents via databases, services, websites, or the like. If the profile system 12 does not have access to the relevant documents, at block 94, the profile system 12 may send a notification to the computing device of the user requesting additional information or the documents that it may not be able to access.

In some embodiments, the notification transmitted at block 94 may cause the computing device that receives the notification to present a visualization of the content of the notification. In some embodiments, the notification may cause the computing device to open an application that may assist the user to track or identify the documents that the profile system 12 is requesting. In this way, the user may systematically collect and send the documents to the profile system 12. In some embodiments, the application being executed on the computing device may enable the user to acquire image data of the requested document and send the image data via the application to the profile system 12. In addition, the application may be accessible across the operating system of the computing device, such that documents and/or images stored on the computing device may be selected for transmittal to the application. The application may then, in turn, send the collected documents or images to the profile system 12 at block 96.

In some embodiments, the profile system 12 may, at block 96, receive additional data concerning the requested documents via email, text message, or some other suitable protocol. That is, the profile system 12 may receive the requested documents via an alternate communication channel instead of the application being executed on the computing device. In some cases, the profile system 12 may send out requests via the respective protocol for the data and receive the requested documents via the same communication protocol. After receiving the data at block 96, the profile system 12 may cross reference the sender's information (e.g., phone number, email address) with the user seeking the loan and associate the received information with the user.

In some embodiments, to receive the additional information, the profile system 12 may send a request for data to other organizations or entities. For example, to retrieve pay stub data, the profile system 12 may send a request to an organization tasked with issuing paycheck stubs to the user. The organization, upon request, may send an electronic document representative of the user's paycheck stubs to the profile system 12 after receiving a confirmation or authorization from the user.

After receiving the additional information related to completing the underwriting process, the profile system 12 may proceed to block 98 as generate a loan profile for the user based on the analysis performed at block 92 and the additional data received at block 96. The loan profile may be a data file, such as a document, spreadsheet, or the like that lists the relevant information for an underwriter confirming certain aspects of a loan request. In some embodiments, the loan profile may be accessed via an application or software that generates a visualization representative of a list of items related to the underwriting application for a particular loan for the user. The visualization may include interactive graphical elements that serve as electronic links to view or access supporting information or documents related to the specific item in the list. For example, the visualization may include an item for a gift letter associated with a particular deposit. After receiving a selection at the corresponding graphical element, the profile system 12 may generate another visualization representative of the selected item, such as a copy of the gift letter.

The loan profile may thus include various documents and attachments that may assist an underwriter in assessing a risk associated with providing the user the loan amount. As mentioned above, the profile system 12 may generate the loan profile without receiving a request from the user to apply for a loan. Indeed, the loan profile may be generated automatically in anticipation of the user seeking a loan based on the loan indicators. After generating the loan profile, the profile system 12 may store the loan profile in any suitable storage component, such as hard drive, a cloud-based computing system, or the like.

At block 100, the profile system 12 may receive updated data from the data sources described above. That is, the profile system 12 may receive an indication that data previously received from the profile system 12 has changed. Alternatively, the profile system 12 may query the data sources at regular or irregular intervals to determine whether the previously received data is still representative of the user's current status. If updated data is present, the profile system 12 may return to block 92 and analyze the history of the received data in view of the loan parameters. If updated data is not available, the profile system 12 may proceed to block 102.

At block 102, the profile system 12 may receive a request for an underwriting report for a loan amount. In some cases, the profile system 12 may wait to receive the request from the user who is associated with the generated the loan profile. In this way, the user is likely ready to apply to secure a loan for a particular property. After receiving the request, at block 104, the profile system may generate an underwriting report based on the loan profile for the user. The underwriting report may include documents that summarize a risk associated with providing the user each of the pieces of data stored in the loan profile. In some embodiments, the underwriting report may be a digital file that may present the information stored in the loan profile as described above.

After generating the underwriting report, the profile system 12 may send the report to a computing device associated with the user, an underwriting authority, a loan provider, or the like. In some embodiments, the request for the underwriting report may include a designated recipient, such as an email address, a phone number, or other suitable address that may receive digital information. It should be noted that, in some embodiments, after receiving the request for the underwriting report, the profile system 12 may send the stored loan profile to a recipient designated in the request. That is, the loan profile may include relevant data that may be used by other organizations to generate underwriting reports according to the preferences or practices by those organizations.

In some embodiments, the request received at block 102 may include details regarding a type or property that is being acquired using the loan, an amount of the loan. Here, the profile system 12 may determine a risk associated with the user obtaining the loan at the requested amount based on the loan profile. If the risk is less than some threshold, the profile system 12 may issue a loan to the user by updating a blockchain or public ledger to indicate that the user has secured a loan for the property. As such, a seller seeking to determine whether the user is capable of purchasing the property may query the block chain to verify that the user has secured a loan. This efficient verification process may enable the user to compete with cash offers and other financing offers because the loan is ready and closing may occur quickly.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a processor configured to:
detect one or more loan indicators present in a first location data set of a first user based on one or more shared data characteristics between the first location data set and a second location data set associated with a plurality of users that obtained one or more loans over a period of time, wherein the one or more loan indicators correspond to a first set of locations of the first user corresponding to a second set of locations of one or more properties for sale;
retrieve additional data associated with the first user in response to detecting the one or more loan indicators, wherein the additional data comprises data acquired from a home assistant device, a wearable device, a computing device, or any combination thereof;
identify one or more correlations between the additional data and the one or more loan indicators to produce a first correlated pattern data set associated with the first user;
compare the first correlated pattern data set with a plurality of correlated pattern data sets associated with the plurality of users, wherein each of the plurality of correlated pattern data sets comprise a set of correlations between a respective portion of the second location data set and one or more respective data sets acquired from one or more additional home assistant devices, one or more additional wearable devices, one or more additional computing devices, or any combination thereof;
determine a loan probability associated with the first user based on a percentage of data points shared between the first correlated pattern data and the plurality of correlated pattern data sets;
determine a pre-approval loan amount based on a banking data set and a credit data set associated with the first user in response to the loan probability exceeding a threshold; and
automatically send a notification indicative of the pre-approval loan amount to a computing device associated with the first user, wherein the notification is configured to automatically cause the computing device to activate an application to display a visualization indicative of the pre-approval loan amount via an electronic display.

2. The system of claim 1, wherein the processor is configured to:
receive updated banking data and updated credit data associated with the first user; and
generate a loan profile associated with the first user based on the updated banking data and the updated credit data, wherein the loan profile comprises information relevant to underwriting a loan for a property.

3. The system of claim 1, wherein the additional data comprises one or more inquiries for obtaining financing.

4. The system of claim 1, wherein the processor is configured to retrieve the first location data set from the home assistant device, the wearable device, the computing device, or any combination thereof associated with the first user.

5. The system of claim 1, wherein the processor is configured to:

send one or more requests for one or more documents associated with the first user via one or more communication protocols in response to sending the notification; and receiving the one or more documents associated via the one or more communication protocols in response to sending the one or more requests.

6. The system of claim 5, wherein the notification is configured to cause the application to be executed by the computing device, wherein the application is configured to present the visualization comprising one or more links configured to access the one or more documents.

7. The system of claim 5, wherein the one or more documents comprise a tax form, a paycheck stub, a bank statement, a tax return, a letter, a list of debts, a list of assets, a credit report, a sales agreement, a divorce decree, a bankruptcy ruling, or any combination thereof.

8. The system of claim 1, wherein the application is configured to present the visualization comprising a list of one or more items related to an underwriting application associated with receiving a loan for the pre-approval loan amount.

9. A method, comprising:

detecting, via at least one processor, one or more loan indicators present in a first location data set of a first user based on one or more shared data characteristics between the first location data set and a second location data set associated with a plurality of users that obtained one or more loans over a period of time, wherein the one or more loan indicators correspond to an association between a first set of locations of the first user and a second set of locations of one or more properties for sale;

retrieving, via the at least one processor, additional data associated with the first user in response to detecting the one or more loan indicators, wherein the additional data comprises data acquired from a home assistant device, a wearable device, a computing device, or any combination thereof;

identifying, via the at least one processor, one or more correlations between the additional data and the one or more loan indicators to produce a first correlated pattern data set associated with the first user;

comparing, via the at least one processor, the first correlated pattern data set with a plurality of correlated pattern data sets associated with the plurality of users, wherein each of the plurality of correlated pattern data sets comprise a set of correlations between a respective portion of the second location data set and one or more respective data sets acquired from one or more additional home assistant devices, one or more additional wearable devices, one or more additional computing devices, or any combination thereof;

determining, via the at least one processor, a loan probability associated with the first user based on a percentage of data points shared between the first correlated pattern data and the plurality of correlated pattern data sets;

determining, via the at least one processor, a pre-approval loan amount based on a banking data set and a credit data set associated with the first user in response to the loan probability exceeding a threshold; and automatically, via the at least one processor, sending a notification indicative of the pre-approval loan amount to a computing device associated with the first user, wherein the notification is configured to automatically cause the computing device to activate an application to display a visualization indicative of the pre-approval loan amount via an electronic display.

10. The method of claim 9, comprising retrieving the first location data set from the home assistant device, the wearable device, the computing device, or any combination thereof associated with the first user.

11. The method of claim 9, wherein determining the loan probability comprises:

identifying one or more patterns of behavior in the additional data;

determining a set of pattern data by correlating the one or more patterns to the banking data set, the credit data set, or both;

performing a comparison between the one or more patterns and one or more other patterns of behavior for a plurality of individuals who sought loans; and determining the loan probability based on the comparison.

12. The method of claim 9, wherein the notification is configured to cause an application to be executed by the computing device, wherein the application is configured to acquire image data of one or more documents associated with receiving a loan for the pre-approval loan amount.

13. The method of claim 9, wherein the application is configured to present a visualization comprising a list of one or more items related to an underwriting application associated with receiving a loan for the pre-approval loan amount.

14. The method of claim 13, wherein each of the one or more items correspond to one or more links configured to access one or more documents associated with the underwriting application.

15. The method of claim 14, comprising receiving one or more updated documents via one or more data sources accessible via the one or more links.

16. The method of claim 15, wherein the one or more updated documents are received at regular intervals.

17. A non-transitory computer-readable medium, comprising computer-executable instructions that, when executed, are configured to cause at least one processor to perform operations comprising:

detecting one or more loan indicators present in a first location data set of a first user based on one or more shared data characteristics between the first location data set and a second location data set associated with a plurality of users that obtained one or more loans over a period of time, wherein the one or more loan indicators are determined based on a first set of locations of the first user and a second set of locations of one or more properties for sale;

retrieving additional data associated with the first user in response to detecting the one or more loan indicators, wherein the additional data comprises data acquired from a home assistant device, a wearable device, a computing device, or any combination thereof;

identifying one or more correlations between the additional data and the one or more loan indicators to produce a first correlated pattern data set associated with the first user;

comparing the first correlated pattern data set with a plurality of correlated pattern data sets associated with the plurality of users, wherein each of the plurality of correlated pattern data sets comprise a set of correlations between a respective portion of the second location data set and one or more respective data sets acquired from one or more additional home assistant devices, one or more additional wearable devices, one or more additional computing devices, or any combination thereof;

determining a loan probability associated with the first user based on a percentage of data points shared between the first correlated pattern data and the plurality of correlated pattern data sets;

determining a pre-approval loan amount based on a banking data set and a credit data set associated with the first user in response to the loan probability exceeding a threshold; and automatically sending a notification indicative of the pre-approval loan amount to a computing device associated with the first user, wherein the notification is configured to automatically cause the computing device to activate an application to display a visualization indicative of the pre-approval loan amount via an electronic display.

18. The non-transitory computer-readable medium of claim 17, wherein the computer-executable instructions are configured to cause the at least one processor to perform the operations comprising:

receiving updated banking data and updated credit data associated with the first user; and generating a loan profile associated with the first user based on the updated banking data and the updated credit data, wherein the loan profile comprises information relevant to underwriting a loan for a property.

19. The non-transitory computer-readable medium of claim 17, wherein the computer-executable instructions are configured to cause the at least one processor to perform the operations comprising retrieving the first location data set from the home assistant device, the wearable device, the computing device, or any combination thereof associated with the first user.

20. The non-transitory computer-readable medium of claim 17, wherein the computer-executable instructions are configured to cause the at least one processor to perform the operations comprising:

sending one or more requests for one or more documents associated with the first user via one or more communication protocols in response to sending the notification; and receiving the one or more documents associated via the one or more communication protocols in response to sending the one or more requests.

* * * * *